United States Patent [19]

Tran

[11] Patent Number: 5,794,028
[45] Date of Patent: Aug. 11, 1998

[54] SHARED BRANCH PREDICTION STRUCTURE

[75] Inventor: Thang M. Tran, Austin, Tex.

[73] Assignee: Advanced Micro Devices, Inc., Sunnyvale, Calif.

[21] Appl. No.: 731,765

[22] Filed: Oct. 17, 1996

[51] Int. Cl.$^6$ ......................................................... G06F 9/38
[52] U.S. Cl. ....................................................................... 395/587
[58] Field of Search ................................... 395/586, 587

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,265,213 | 11/1993 | Weiser et al. ............................. 395/587 |
| 5,367,703 | 11/1994 | Levitan ................................... 395/587 |
| 5,553,253 | 9/1996 | Pan et al. ................................. 395/587 |
| 5,608,886 | 3/1997 | Blomgren et al. ......................... 395/586 |
| 5,642,500 | 6/1997 | Inoue ...................................... 395/580 |
| 5,649,178 | 7/1997 | Blaner et al. ............................. 395/587 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2-1 through 2-4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

*Primary Examiner*—William M. Treat
*Attorney, Agent, or Firm*—Conley, Rose & Tayon; B. Noel Kivlin

[57] ABSTRACT

A shared branch prediction mechanism is provided in which a pool of branch prediction storage locations are shared among the multiple cache lines comprising a row of the instruction cache. The branch prediction storage locations within the pool are dynamically redistributed among the cache lines according to the number of branch instructions within each cache line. A cache line having a large number of branch instructions may be allocated more branch prediction storage locations than a cache line having fewer branch instructions. A prediction selector is included for each cache line in the instruction cache. The prediction selector indicates the selection of one or more branch prediction storage locations which store branch predictions corresponding to the cache line. In one embodiment, the prediction selector comprises multiple branch selectors. One branch selector is associated with each byte in the cache line, and identifies the branch prediction storage location storing the relevant branch prediction for that byte. In another embodiment, each set of two bytes within a cache line shares a portion of the pool with the corresponding set of two bytes from the other cache lines within the pool. The prediction selector for the cache line indicates which sections of the cache line have associated branch prediction storage locations allocated to them, as well as a taken/not-taken prediction associated therewith. The first taken prediction within the line subsequent to the offset indicated by the fetch address is the branch prediction selected.

22 Claims, 13 Drawing Sheets

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $W_1$ | $B_1$ | | $B_2$ | | $B_3$ | | | | | | $B_4$ | | $B_5$ | | | |
| $W_2$ | | | | | | | $B_6$ | | | | | | | $B_7$ | | |
| $W_3$ | | | | $B_8$ | | | | | | | | | | | | |
| $W_4$ | | | | | | | | | | | | | | | | |
| $W_5$ | | | | | | | | | | | | | | | | |
| $W_6$ | | $B_9$ | | | | | $B_{10}$ | | $B_{11}$ | | | | | $B_{12}$ | | |
| $W_7$ | | | | | | | | | | | | | | | $B_{13}$ | |
| $W_8$ | | | | | $B_{14}$ | | | | $B_{15}$ | | $B_{16}$ | | | | | |

←68

| | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ | $P_{15}$ | $P_{16}$ |
|---|---|---|---|---|---|---|---|---|---|---|---|---|---|---|---|---|
| Shared Prediction Pool | $B_1$ | $B_9$ | $B_2$ | $B_8$ | $B_3$ | $B_{14}$ | $B_{10}$ | $B_6$ | $B_{11}$ | $B_{15}$ | $B_4$ | $B_{16}$ | $B_5$ | $B_7$ | $B_{12}$ | $B_{13}$ |

| Byte Position | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Branch Selector | 1 | 1 | 8 | 8 | 5 | 5 | 5 | 5 | 2 | 2 | 2 | 0 | 0 | 0 | 0 | 0 |

FIG. 6

| Byte Position | 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|
| Branch Selector | 1 | 1 | 3 | 3 | 3 | 3 | 3 | 3 | 3 | 3 | 3 | 0 | 0 | 0 | 0 | 0 | 102 |
| Update Mask | 1 | 1 | 1 | 1 | 1 | 1 | 1 | 0 | 0 | 0 | 0 | 0 | 0 | 0 | 0 | 0 | 104 |
| Branch Mask | 0 | 0 | 1 | 1 | 1 | 1 | 1 | 1 | 1 | 1 | 1 | 0 | 0 | 0 | 0 | 0 | 106 |
| Final Update Mask | 0 | 0 | 1 | 1 | 1 | 1 | 1 | 0 | 0 | 0 | 0 | 0 | 0 | 0 | 0 | 0 | 107 |
| Extended Mask | 0 | 0 | 0 | 0 | 0 | 0 | 0 | 0 | 0 | 0 | 0 | 0 | 0 | 0 | 0 | 0 | 108 |
| Update Branch Selectors | 1 | 1 | 8 | 8 | 8 | 8 | 8 | 3 | 3 | 3 | 3 | 0 | 0 | 0 | 0 | 0 | 109 |

FIG. 8A

| Byte Position | 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|
| Branch Selector | 1 | 1 | 3 | 3 | 3 | 3 | 3 | 3 | 3 | 3 | 3 | 0 | 0 | 0 | 0 | 0 | 102 |
| Update Mask | 1 | 1 | 1 | 1 | 1 | 1 | 1 | 0 | 0 | 0 | 0 | 0 | 0 | 0 | 0 | 0 | 104 |
| Branch Mask | 0 | 0 | 1 | 1 | 1 | 1 | 1 | 1 | 1 | 1 | 1 | 0 | 0 | 0 | 0 | 0 | 106 |
| Final Update Mask | 0 | 0 | 1 | 1 | 1 | 1 | 1 | 0 | 0 | 0 | 0 | 0 | 0 | 0 | 0 | 0 | 107 |
| Extended Mask | 0 | 0 | 0 | 0 | 0 | 0 | 0 | 1 | 1 | 1 | 1 | 0 | 0 | 0 | 0 | 0 | 108 |
| Update Branch Selectors | 1 | 1 | 3 | 3 | 3 | 3 | 3 | 0 | 0 | 0 | 0 | 0 | 0 | 0 | 0 | 0 | 109 |

FIG. 8B

SHARED BRANCH PREDICTION STRUCTURE

FIELD OF THE INVENTION

The present invention relates to the field of microprocessors and, more particularly, to branch prediction mechanisms within microprocessors.

DESCRIPTION OF THE RELEVANT ART

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

An important feature of a superscalar microprocessor (and a superpipelined microprocessor as well) is its branch prediction mechanism. The branch prediction mechanism indicates a predicted direction (taken or not-taken) for a branch instruction, allowing subsequent instruction fetch to continue within the predicted instruction stream indicated by the branch prediction. The predicted instruction stream includes instructions immediately subsequent to the branch instruction in memory if the branch instruction is predicted not-taken, or the instructions at the target address of the branch instruction if the branch instruction is predicted taken. Instructions from the predicted instruction stream may be speculatively executed prior to execution of the branch instruction, and in any case are placed into the instruction processing pipeline prior to execution of the branch instruction. If the predicted instruction stream is correct, then the number of instructions executed per clock cycle is advantageously increased. However, if the predicted instruction stream is incorrect (i.e. one or more branch instructions are predicted incorrectly), then the instructions from the incorrectly predicted instruction stream are discarded from the instruction processing pipeline and the number of instructions executed per clock cycle is decreased.

In order to be effective, the branch prediction mechanism must be highly accurate such that the predicted instruction stream is correct as often as possible. Typically, increasing the accuracy of the branch prediction mechanism is achieved by increasing the complexity of the branch prediction mechanism. For example, a cache-line based branch prediction scheme may be employed in which branch predictions are stored with a particular cache line. When the cache line is fetched, the corresponding branch predictions are also fetched. Furthermore, when the particular cache line is discarded, the corresponding branch predictions are discarded as well. A cache-line based branch prediction scheme may be made more accurate by storing a larger number of branch predictions for each cache line. A given cache line may include multiple branch instructions, each of which is represented by a different branch prediction. Therefore, more branch predictions allocated to a cache line allows for more branch instructions to be represented and predicted by the branch prediction mechanism. A branch instruction which cannot be represented within the branch prediction mechanism is not predicted, and subsequently a "misprediction" may be detected if the branch is found to be taken. However, complexity of the branch prediction mechanism is increased by the need to select between additional branch predictions. As used herein, a "branch prediction" is a value which may be interpreted by the branch prediction mechanism as a prediction of whether or not a branch instruction is taken or not taken. Furthermore, a branch prediction may include the target address. For cache-line based branch prediction mechanisms, a prediction of a sequential line to the cache line being fetched is a branch prediction when no branch instructions are within the instruction being fetched from the cache line.

Unfortunately, increasing the number of branch predictions stored per cache line increases the amount of storage employed by the branch prediction mechanism. A proportionately larger die size is therefore required to implement the branch prediction mechanism. Either the die size of the microprocessor is increased (increasing the manufacturing cost of the microprocessor), or other functionality of the microprocessor may be removed to retain a desired die size (possibly decreasing microprocessor performance).

Another problem related to increasing the complexity of the branch prediction mechanism is that the increased complexity generally requires an increased amount of time to form the branch prediction. For example, selecting among multiple branch predictions may require a substantial amount of time. The offset of the fetch address identifies the first byte being fetched within the cache line: a branch prediction for a branch instruction prior to the offset should not be selected. The offset of the fetch address within the cache line may need to be compared to the offset of the branch instructions represented by the branch predictions stored for the cache line in order to determine which branch prediction to use. The branch prediction corresponding to a branch instruction subsequent to the fetch address offset and nearer to the fetch address offset than other branch instructions which are subsequent to the fetch address offset should be selected. As the number of branch predictions is increased, the complexity (and time required) for the selection logic increases. When the amount of time needed to form a branch prediction for a fetch address exceeds the clock cycle time of the microprocessor, performance of the microprocessor may be decreased. Because the branch prediction cannot be formed in a single clock cycle, "bubbles" are introduced into the instruction processing pipeline during clock cycles that instructions cannot be fetched due to a lack of a branch prediction corresponding to a previous fetch address. The bubble occupies various stages in the instruction processing pipeline during subsequent clock cycles, and no work occurs at the stage including the bubble because no instructions are included in the bubble. Performance of the microprocessor may thereby be decreased.

SUMMARY OF THE INVENTION

The problems outlined above are in large part solved by a shared branch prediction mechanism in accordance with the present invention. The shared branch prediction mechanism provides a pool of branch prediction storage locations which are shared among multiple cache lines. For example, the cache lines comprising a row of the instruction cache may share a pool of branch prediction storage locations. The branch prediction storage locations within the pool are dynamically redistributed among the cache lines according to the number of branch instructions within each cache line. Advantageously, a cache line having a large number of branch instructions may be allocated more branch prediction storage locations than a cache line having fewer branch instructions. The number of branch prediction storage locations for the cache line having the large number of branch prediction storage locations Is increased at the expense of the number of branch prediction storage locations for the cache line having fewer branch instructions. In other words, the allocation of branch prediction storage locations is more efficient than the formerly used static allocation of branch prediction storage locations. The total number of branch prediction storage locations may remain the same as a set of branch prediction storage locations statically assigned to cache lines while providing the capability for storing more branch predictions with respect to a given cache line. Branch prediction accuracy may be increased since branch instructions may more likely be represented in the shared branch prediction storage locations.

A prediction selector is included for each cache line in the instruction cache. The prediction selector indicates the selection of one or more branch prediction storage locations which store branch predictions corresponding to the cache line. In one embodiment, the prediction selector comprises multiple branch selectors. One branch selector is associated with each byte in the cache line. The branch selector identifies the branch prediction storage location storing the branch prediction information corresponding to a branch instruction which is subsequent to the byte within the cache line, but prior to any other branch instructions within the cache line and subsequent to the byte. The branch selector is used to select the branch prediction storage location from the pool of branch prediction storage locations. In another embodiment, portions of the pool of branch prediction storage locations are shared among sections of the cache lines sharing the pool. For example, each set of two bytes within a cache line may share a portion of the pool with the corresponding set of two bytes from the other cache lines within the pool. The prediction selector for the cache line indicates which sections of the cache line have associated branch prediction storage locations allocated to them, as well as a taken/not-taken prediction associated therewith. The first taken prediction within the line subsequent to the offset indicated by the fetch address is the branch prediction selected.

The prediction selectors associated with the cache lines simplify and speed the determination of which of multiple branch predictions is used for a given instruction fetch. Instead of a comparison of pointers to branch instructions with the offset of the fetch address, the branch selectors directly identify the branch prediction for the offset byte. Therefore, the large number of branch predictions which may be stored for a given cache line may not impede the clock frequency at which the branch prediction mechanism described herein operates. Advantageously, the accuracy of the branch prediction mechanism is increased without incurring a corresponding clock frequency reduction (i.e. clock cycle extension). Implementation of the prediction selectors may allow the branch prediction mechanism to operate within one clock cycle wherein other branch prediction mechanisms may not be able to operate as such.

Broadly speaking, the present invention contemplates a branch prediction apparatus comprising an instruction bytes storage and a branch prediction storage. The instruction bytes storage is configured to store a first plurality of instruction bytes in a first storage location and a second plurality of instruction bytes in a second storage location. The branch prediction storage includes a first branch prediction storage location which is shared by the first storage location and the second storage location whereby a first branch prediction corresponding to a first branch instruction within the first plurality of instruction bytes is stored in the first branch prediction storage location during a first clock cycle and a second branch prediction corresponding to a second branch instruction within the second plurality of instruction bytes is stored in the first branch prediction storage location during a second clock cycle.

The present invention further contemplates a method for forming branch predictions in a microprocessor. A plurality of bytes are fetched from an instruction cache. A branch prediction is selected from one of a pool of branch predictions shared by the plurality of bytes and at least one other plurality of bytes within the instruction cache. The branch prediction is selected via a prediction selector corresponding to the plurality of bytes.

The present invention still fur-her contemplates a microprocessor comprising an instruction cache and a branch prediction unit. The instruction cache is configured to store a first cache line of instructions and a second cache line of instructions. The branch prediction unit is coupled to the instruction cache and is configured to share a plurality of branch prediction storage locations between the first cache line of instructions and the second cache line of instructions. Each one of the plurality of branch prediction storage locations is assignable to store a branch prediction corresponding to a branch instruction within either one of the first cache line of instructions and the second cache line of instructions.

Additionally, the present invention contemplates a branch prediction apparatus comprising an instruction cache and a branch prediction storage. The instruction cache is configured to store a plurality of cache lines of instruction bytes. The branch prediction storage includes a plurality of branch prediction storage locations. The plurality of branch prediction storage locations is shared between the plurality of cache lines of instruction bytes whereby any one of the plurality of branch prediction storage locations is assignable to any one of the plurality of cache lines of instruction bytes for storing a branch prediction for a branch instruction within any one of the plurality of cache lines of instruction bytes.

BRIEF DESCRIPTION OF THE DRAWINGS

Other objects and advantages of the invention will become apparent upon reading the following detailed description and upon reference to the accompanying drawings in which:

FIG. 4 is an example of the use of the shared branch prediction structure shown in FIG. 3.

FIG. 6 is an exemplary set of branch selectors for a cache line.

FIG. 8A is a first example of the masks generated according to the flowchart shown in FIG. 7.

FIG. 8B is a second example of the masks generated according to the flowchart shown in FIG. 7.

Figure 1:
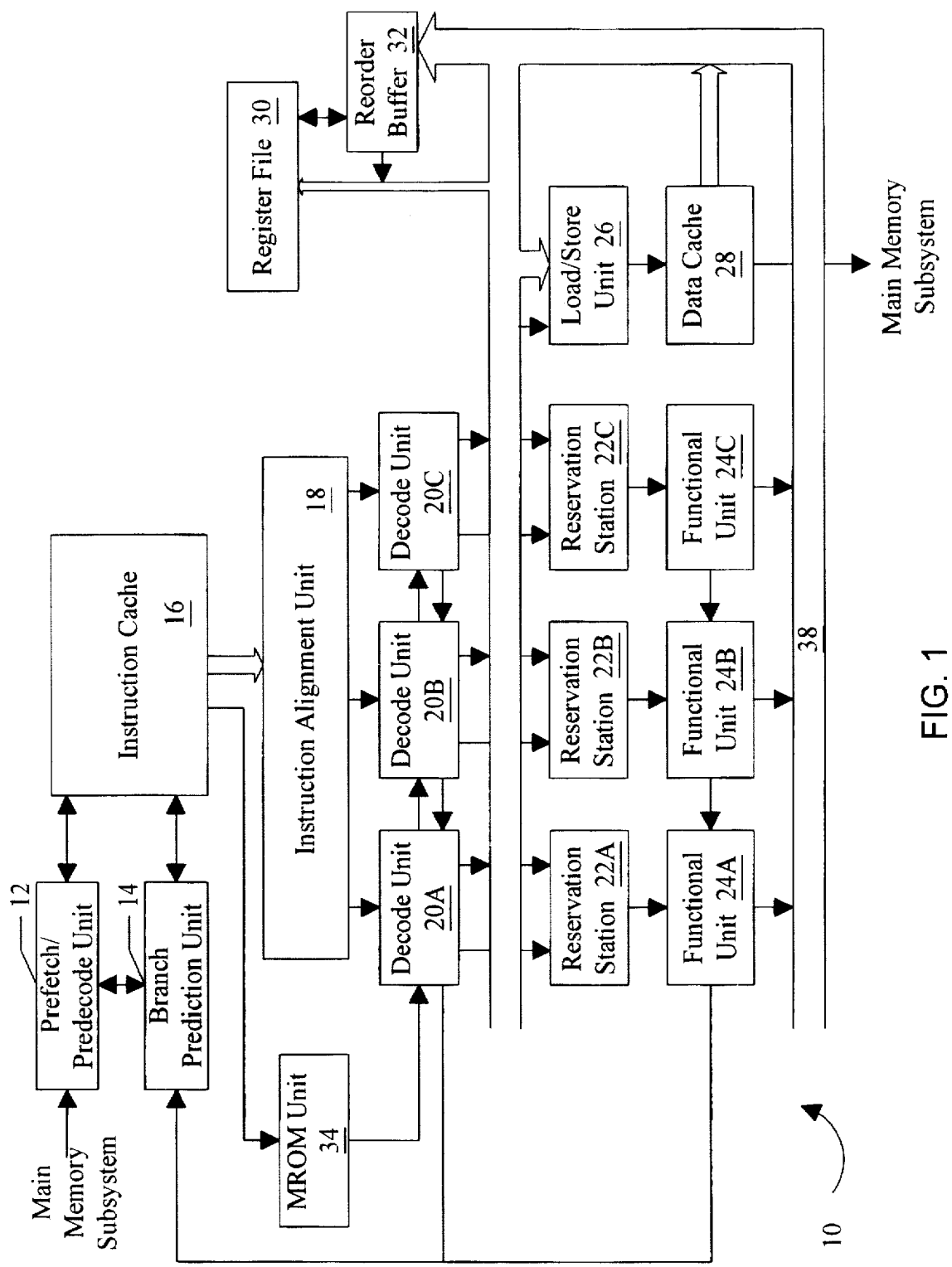
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A-20C, a plurality of reservation stations 22A-22C, a plurality of functional units 24A-24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A-20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A-20C is coupled to load/store unit 26 and to respective reservation stations 22A-22C. Reservation stations 22A-22C are further coupled to respective functional units 24A-24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, branch prediction unit 14 employs a shared branch prediction structure for improved branch prediction accuracy while retaining a similar number of branch prediction storage locations as a non-shared branch prediction implementation. Multiple cache lines are grouped together and a pool of branch prediction storage locations are assigned to the multiple cache lines. Any branch prediction storage location within the pool may be assigned to store a branch prediction corresponding to a branch instruction within any of the multiple cache lines. The branch prediction storage locations are redistributed dynamically based upon the number of branch instructions within each of the multiple cache lines. If one of the cache lines does not include any branch instructions, none of the branch prediction storage locations are assigned to that cache line. If another of the cache lines includes four branch instructions, up to four branch prediction storage locations may be assigned to that cache line. Advantageously, more branch prediction storage locations may be allocated to cache lines within the group which have more branch instructions, and fewer branch prediction storage locations may be allocated to cache lines having fewer branch instructions. The number of branch prediction storage locations allocated to a particular cache line adapts to the number of branch instructions within the cache line and the number of branch instructions included within other cache lines of the group.

The dynamic allocation of branch prediction storage locations to cache lines within the group may lead to a greater overall usage of the available branch prediction storage locations than a static allocation of the branch prediction storage locations. For example, a group of cache lines may include a first cache line having three branch instructions and a second cache line having one branch instruction. In the example, the pool of branch prediction storage locations may include four branch prediction storage locations. Three of the branch prediction storage locations may be assigned to the first cache line and the remaining branch prediction storage location may be assigned to the second cache line. All of the branch prediction storage locations are thereby used. Conversely, a static allocation of two branch prediction storage locations to each cache line would lead to three branch prediction storage locations being used in the example: both of the branch prediction storage locations corresponding to the first cache line and one of the branch prediction storage locations corresponding to the second cache line. Furthermore, one of the branch instructions in the first cache line would not be represented within the branch prediction storage locations.

In one embodiment, instruction cache 16 is a set-associative cache. A set-associative cache is a two dimensional structure for cache lines. The rows of the set-associative cache are referred to as sets, and the columns are referred to as ways. A row is selected using a portion of the address (the "index") accessing the cache, and one of the columns is selected by comparing the access address to tags which identify the cache lines stored in each way of the selected row. The group of cache lines which share a pool of branch prediction storage locations in this embodiment is the cache lines within the set (or row). Branch prediction unit 14 receives the access address (or fetch address) concurrent with instruction cache 16. A branch prediction storage is accessed using the fetch address, and a pool of branch prediction storage locations shared by the set of cache lines is selected. Additionally, a prediction selector storage is accessed. The prediction selector storage provides a selection of a branch prediction from the pool of branch prediction storage locations. The prediction is used to form the fetch address for the subsequent clock cycle.

As used herein, the term "pool" refers to two or more storage locations which are shared among multiple cache lines. Any of the storage locations within the pool may be assigned to any of the multiple cache lines. Additionally, the term "cache line" refers to a plurality of bytes stored and manipulated by a cache as a unit. The plurality of bytes are contiguous in main memory, and the first of the plurality of bytes is at an aligned address for the plurality of bytes.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| Start bits | 10000 |
|---|---|
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, multiple branch predictions including branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are open merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded.

Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way.

In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
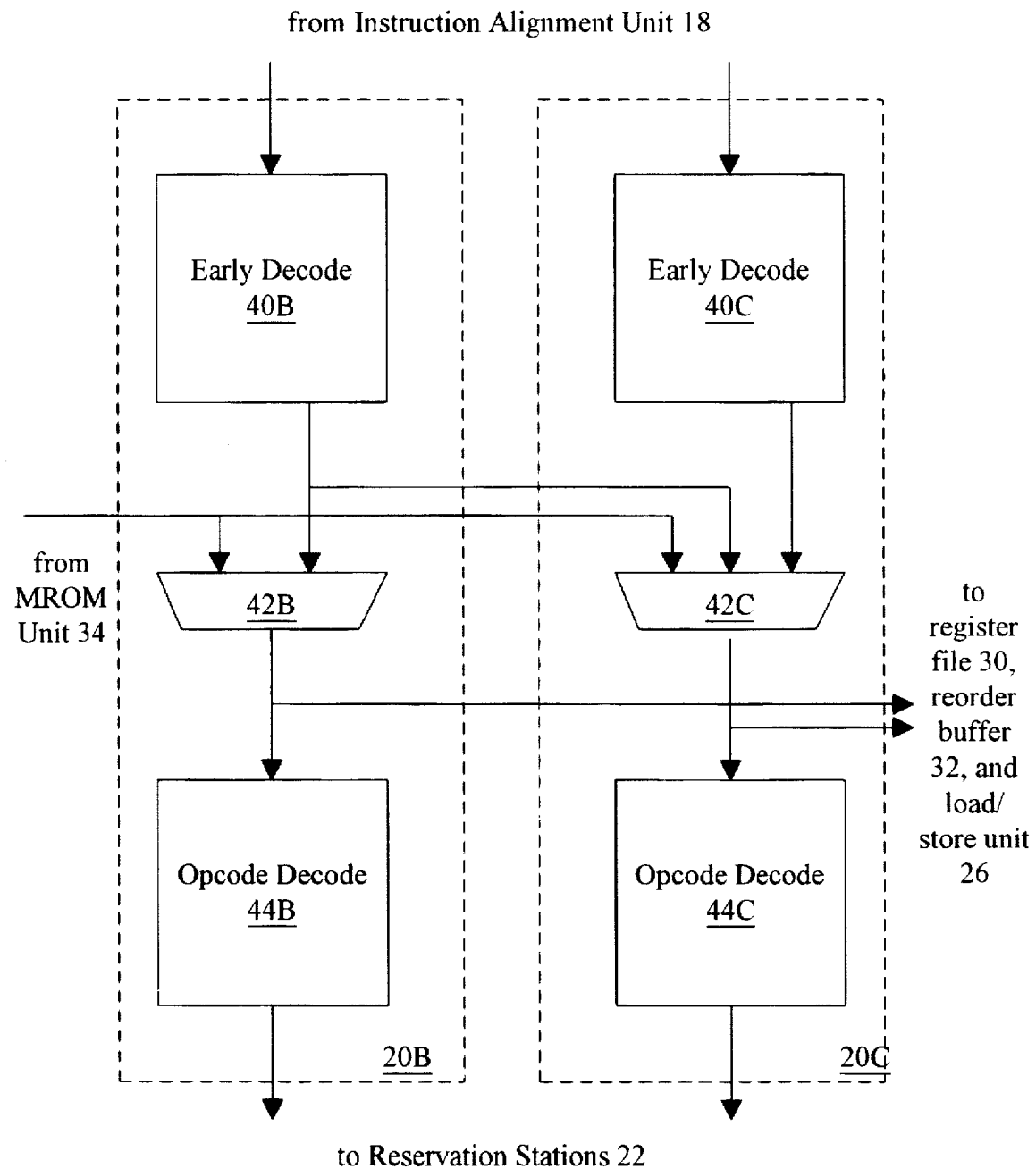
FIG. 2 is a block diagram of ones embodiment of a pair of decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MFOM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which early decode unit 40A detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands an d generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
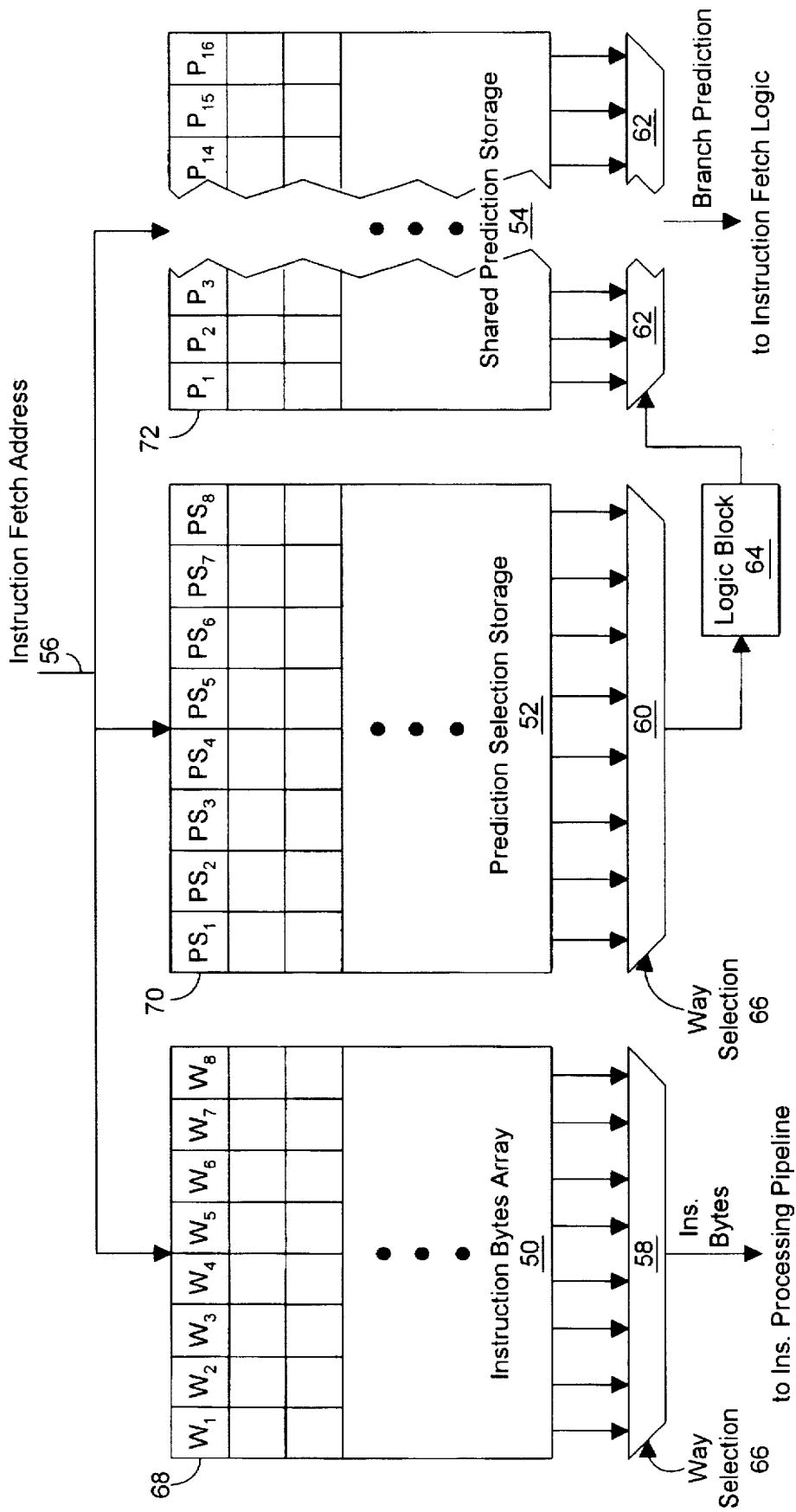
FIG. 3 is a block diagram of one embodiment of a shared branch prediction structure.

Turning now to FIG. 3, a block diagram of one embodiment of a shared branch prediction structure is shown. Other embodiments are contemplated. The block diagram of FIG. 3 depicts a shared branch prediction structure in a generalized form, while other embodiments shown herein are employed within the embodiment of microprocessor 10 shown in FIG. 1. As shown in FIG. 3, the shared branch prediction structure includes an instruction bytes array 50, a prediction selection storage 52, and a shared prediction storage 54. An instruction fetch address 56 is concurrently provided to each of instruction bytes array 50, prediction selection storage 52, and shared prediction storage 54. Instruction bytes array 50 is coupled to a multiplexor 58. Similarly, prediction selection storage 52 is coupled to a multiplexor 60 and shared prediction storage 54 is coupled to a multiplexor 62. The output of multiplexor 60 is fed to a logic block 64 which provides selection controls for multiplexor 62. Selection controls for multiplexors 58 and 60 are derived from a way selection 66 corresponding to the instruction fetch address. Way selection 66 may be a way prediction corresponding to the instruction fetch address, or may be generated through tag comparisons between the instruction fetch address and the tags within the selected row of the instruction cache.

Instruction bytes array 50 stores instruction bytes in cache-line sized quantities. Upon presentation of an instruction fetch address 56, instruction bytes array 50 selects a row of cache lines of instruction bytes and provides the row to multiplexor 58. Way selection 66 selects one of the cache lines for conveyance into the instruction processing pipeline of the microprocessor employing the shared branch prediction structure. Although any amount of associativity may be employed, instruction bytes array 50 as shown in FIG. 3 is an eight way set-associative array. A row 68 of instruction bytes array 50 therefore includes eight ways $W_1$ through $W_8$ in the present embodiment.

Instruction fetch address 56 is additionally presented to prediction selection storage 52. Prediction selection storage 52 stores a prediction selector corresponding to each of the cache lines o f instruction bytes stored in instruction bytes array 50. Prediction selection storage 52 may have the same geometry (i.e. rows and columns) as instruction bytes array 50. Therefore, a row 70 includes a prediction selector $PS_1$ corresponding to way $W_1$ of row 68, a prediction selector $PS_2$ corresponding to way $W_1$ of row 68, etc. The prediction selector for each cache line is a value or set of values which identifies one or more of the branch prediction storage locations within the shared prediction storage which is storing a branch prediction or predictions corresponding to the cache line being fetched. The row indexed by instruction fetch address 56 is conveyed to multiplexor 60, which selects one of the prediction selectors via way selection 66. The selected prediction selector is received by logic block 64, which then provides selection controls to multiplexor 62 in response to the selected prediction selector. The selected branch prediction is conveyed to the instruction fetch logic for use in forming the fetch address for the subsequent clock cycle.

Shared prediction storage 54 receives instruction fetch address 56 as well, and selects a row of branch prediction storage locations. For example, a row 72 may correspond to row 70 of prediction selection storage 52 and to row 68 of instruction bytes array 50. For the embodiment of FIG. 3, row 72 includes sixteen branch prediction storage locations labeled $P_1$ through $P_{16}$. The branch prediction storage locations within row 72 form the pool of branch prediction storage locations for the cache lines stored in row 68 of instruction bytes array 50. It is noted that the number of branch prediction storage locations in the pool need not be related to the number of cache lines sharing the pool. Any number of branch prediction storage locations which provides sufficient branch prediction accuracy may be used.

Generally, shared prediction storage 54 operates as a direct-mapped storage indexed by instruction fetch address 56. The storage thus accessed is divided into branch prediction storage locations (e.g. $F_1$ through $P_{16}$), and a branch prediction is selected from the branch prediction storage locations in accordance with the prediction selectors stored for the accessed cache line. In this manner, any of the branch prediction storage locations within a row of shared prediction storage 54 may be assigned to a particular cache line stored in a particular way of instruction bytes array 50 (within a row selected by the same instruction fetch address as the row of shared prediction storage 54). In other words, row 72 forms a shared prediction pool for the cache lines stored in row 68. Other rows of shared prediction storage 54 form shared prediction pools for other rows of instruction bytes array 50.

Figure 4:
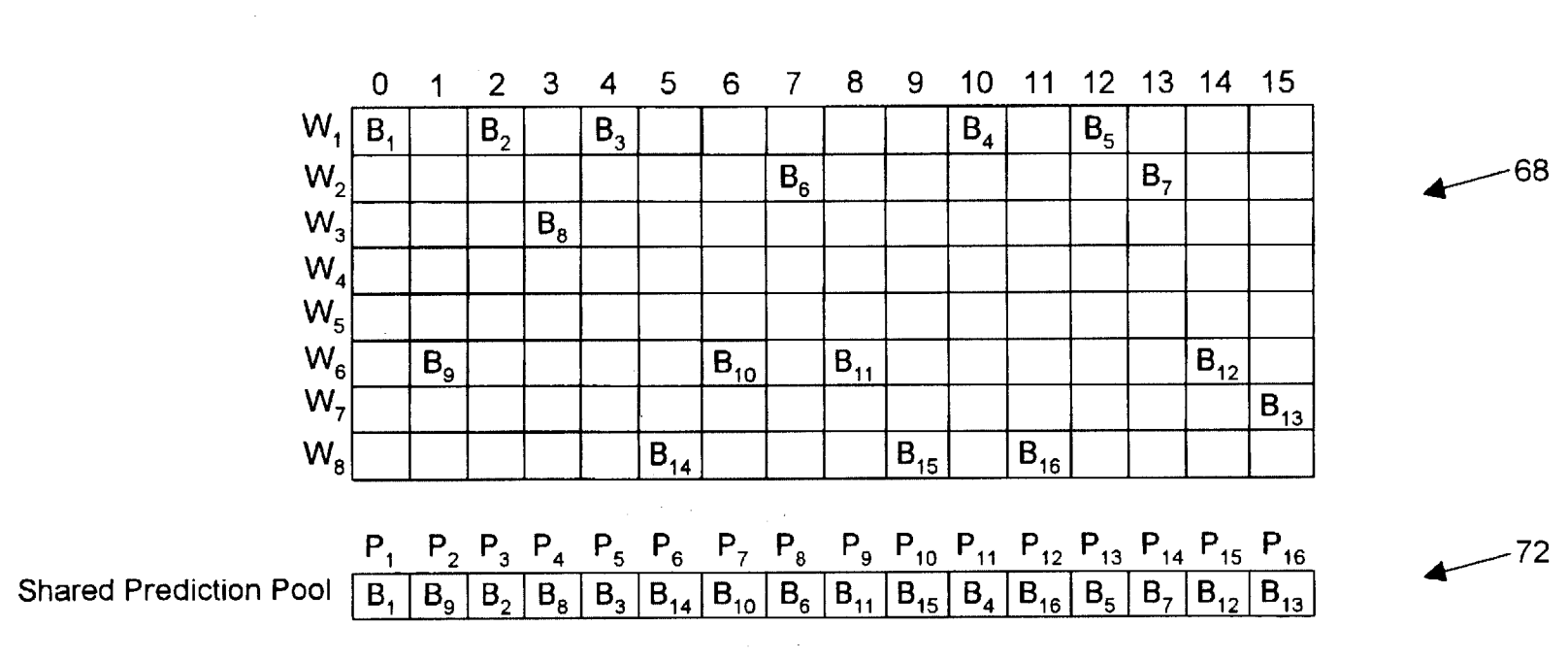

Turning next to FIG. 4, an example of a group of cache lines containing branch instructions and a corresponding shared prediction pool is shown. The group of cache lines may be row 68 shown in FIG. 3, for example. The shared prediction pool is then row 72 shown in FIG. 3. The bytes of each cache line within row 68 are depicted as rows in FIG. 4. each row being labeled by the respective way $W_1$ through $W_8$. The bytes are labeled 0 through 15 for a 16 byte cache line in the present example. Positions within the row which correspond to the end byte of a branch instruction contain a branch indication $B_1$ through $B_{16}$. For example, way $W_1$ includes a first branch instruction $B_1$ ending at byte 0, a second branch instruction $B_2$ ending at byte 2, a third branch instruction $B_3$ ending at byte 4, a fourth branch instruction $B_4$ ending at byte 10, and a fifth branch instruction $B_5$ ending at byte 12. On the other hand, way $W_4$ includes no branch instructions.

The shared prediction pool depicted in FIG. 4 shows an exemplary distribution of the branch prediction storage locations within the shared prediction pool to the branch instructions included in the group of cache lines $W_1$ through $W_8$. As FIG. 4 illustrates, each of the branch instructions within the exemplary group of cache lines is assigned a branch prediction storage location for storing the branch prediction information corresponding to that branch instruction. For example, prediction storage location $P_1$ stores branch prediction information for branch instruction $B_1$ while prediction storage location $P_2$ stores branch prediction information for branch instruction $B_9$. Each of the branch prediction storage locations is used even though the branch instructions are not evenly distributed between the group of cache lines. It is noted that any distribution of branch prediction storage locations may be employed, not just the distribution shown in the example.

Figure 5:
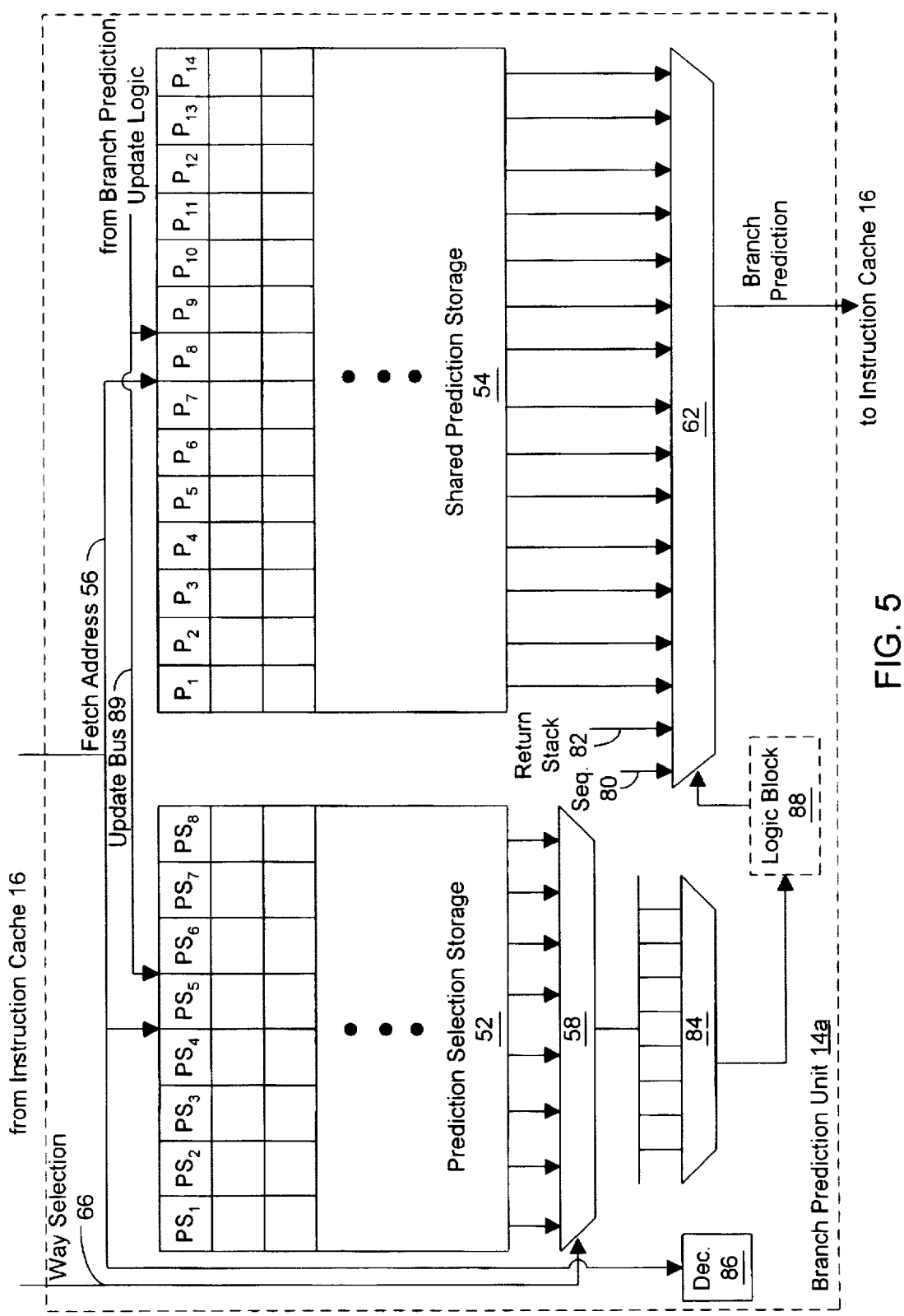
FIG. 5 is a block diagram of another embodiment of a shared branch prediction structure.

Turning now to FIG. 5, a block diagram of a first embodiment of a portion of branch prediction unit 14 (branch prediction unit 14a) is shown. As shown in FIG. 5, branch prediction unit 14a includes prediction selection storage 52 and shared prediction storage 54. In this embodiment, 30 shared prediction storage 54 includes 14 branch prediction storage locations, although any number of branch prediction storage locations may be employed. Prediction selection storage 52 and shared prediction storage 54 are coupled to fetch address bus 56. Prediction selection storage 52 is coupled to multiplexor 58 for selection of one of the prediction selectors $PS_1$ through $PS_8$ via the way selection provided upon way selection bus 66. Shared prediction storage 54 is coupled to multiplexor 62 for selection of a particular branch prediction based upon the prediction selector provided from prediction selection storage 52. A branch prediction is thereby provided to instruction cache 16. In addition to the branch predictions stored in the selected row of shared prediction storage 54, multiplexor 62 receives a sequential address upon a sequential address bus 80 and a return stack address upon a return stack bus 82. Either the sequential address or the return stack address may be selected in response to a particular prediction selector. It is noted that a return stack structure may store return address corresponding to subroutine call instructions (e.g. the CALL instruction of the x86 microprocessor architecture). The return address locates the instruction to be executed upon execution of a subroutine return instruction (e.g. the RET instruction of the x86 microprocessor architecture). Subroutine call and subroutine return instructions are branch instructions. If a subroutine call instruction is detected in the instruction stream, the corresponding return address is placed upon the return stack. If a subroutine return instruction is detected, the return address nearest the top of the return stack is used as the branch prediction address via return stack bus 82.

In the embodiment of FIG. 5, a prediction selector comprises a set of branch selectors. As illustrated in FIG. 5, multiple branch selectors provided by selecting a prediction selector from prediction selection storage 52 are provided to a multiplexor 84. Each of the branch selectors corresponds to a particular byte within the corresponding cache line. The particular branch selector corresponding to the particular byte identifies the branch prediction storage location storing branch prediction information for the first branch instruction (in program order) within the cache line which is subsequent to the particular byte. If the particular byte is the first byte of the cache line which is being fetched (i.e. the least significant bits of the fetch address identify the particular byte), then the branch prediction identified by the particular branch selector is the branch prediction which is appropriate for forming the subsequent fetch address. Another byte prior to the particular byte may encounter a branch instruction prior to the particular byte, and the corresponding branch selector may reflect a different branch prediction storage location than the particular branch selector. If no branch instructions lie between the particular byte and the end of the cache line, the particular branch selector indicates selection of the sequential address. If the first branch instruction subsequent to the particular byte within the cache line is a subroutine return instruction, the branch selector indicates the return stack address.

One of the multiple branch selectors corresponding to the selected cache line is selected by multiplexor 84 under the control of a decoder block 86. Decoder block 86 decodes the least significant bits of the fetch address from fetch address bus 56 (coupled to decoder block 86). The number of least significant bits decoded is determined by the number of bytes in the instruction cache line. For example, four least significant bits are decoded by decoder block 86 for a sixteen byte instruction cache line. These least significant bits are an offset within the cache line, and are not included in the index which selects rows of instruction bytes storage 50 and prediction selection storage 52. The particular branch selector corresponding to the particular byte identified by the offset is thereby selected via multiplexor 84. The prediction selector is provided to a logic block 88, which decodes the prediction selector into select signals for multiplexor 62. In one embodiment, each prediction selector comprises a four bit value providing 16 encodings. The hexadecimal encoding "0" may represent selection of the sequential address. Similarly, the hexadecimal encoding "1" represents the return stack address. The hexadecimal encodings "2" through "f" represent branch predictions $P_1$ through $P_{14}$, respectively.

It is noted that logic block 88 is optional in certain embodiments. For example, the values of the select lines may be stored in prediction selection storage 52, thereby directly providing selection controls to multiplexor 62. Logic block 88 may be omitted in such an embodiment. It is further noted that decoder block 86, multiplexor 84, and logic block 88 together correspond to logic block 64 shown in FIG. 3.

In the embodiment of FIG. 5, the branch prediction information stored in a particular branch prediction storage location may include: the target address of the branch, a way prediction associated with the target address, a two bit saturating counter indicating the taken/not taken prediction, a call bit indicating that the branch is a subroutine call instruction (when set), and a valid bit. Additionally, a cache line indicator may be stored in the particular branch prediction storage location. The cache line indicator determines which of the cache lines which share the pool of branch prediction storage locations including the particular branch prediction storage location is using the particular branch prediction storage location. The cache line indicator may be used to indicate which prediction selector needs to be updated if the particular branch prediction storage location is reassigned to another cache line which shares the pool of branch prediction storage locations including the particular branch prediction storage location.

Prediction selectors are initialized within branch prediction storage 52 via predecoding of the instructions by prefetch/predecode unit 12. When a branch instruction is encountered during predecoding, a branch prediction storage location is selected for storing the branch prediction information. The corresponding pool of branch prediction storage locations and prediction selectors from each cache line within the row may be captured upon detection of the instruction cache miss causing the fetch from the main memory subsystem, thereby allowing examination of the branch prediction information during predecoding. Furthermore, branch prediction information corresponding to the cache line being replaced is invalidated in the captured information. A branch prediction storage location which is not in use (i.e. the valid bit indicates invalid) is selected for storing the branch prediction information. If no branch prediction storage location within the pool is marked invalid, then a branch prediction for which the counter indicates not-taken is selected. If all branch prediction storage locations are storing predicted-taken branch predictions, then a pseudo-random selection among the branch prediction storage locations is used.

Since the branch prediction storage locations are shared between the cache lines within a particular row of instruction bytes storage 50, selection of a branch prediction storage location for storing branch prediction information corresponding to a newly fetched cache line may lead to replacement of branch prediction information corresponding to a different cache mine. The other cache line can be identified from the set of prediction selectors captured when the cache miss is detected. Both the prediction selector corresponding to the cache line to which the branch prediction storage location is allocated and the prediction selector corresponding to the cache line from which the branch prediction storage location is deallocated are updated upon allocation of the branch prediction storage location. It is noted that the updates may be stored in a holding register (not shown) until a clock cycle in which an instruction fetch is not being made prior to updating prediction selection storage 52 and shared prediction selection storage 54. During such a clock cycle, fetch address bus 56 is used to convey the newly fetched address. A set of updated prediction selectors $PS_1$–$PS_8$ and branch predictions P1–P14 are conveyed as well (upon an update bus 89 coupled to shared prediction storage 54 and prediction selection storage 52). The set of updated prediction selectors and branch predictions are stored into prediction selection storage 52 and shared prediction storage 54, respectively. Such a holding register is disclosed in the commonly assigned, co-pending patent application entitled: "Delayed Update Register for an Array", Ser. No. 08/481,914, filed Jun. 6, 1995, by Tran, et al. The disclosure of this patent application is incorporated herein by reference in its entirety.

In a similar fashion, branch prediction storage locations may be updated and reallocated among the group of cache lines when instructions from one of the group of cache lines are fetched. A branch prediction storage location is reallocated, for example, when a branch instruction is detected and the branch instruction is not predicted by the branch selectors stored with a particular cache line. Updates occur to the branch selectors in a cache line when a predicted-taken branch is found to be not-taken, wherein the prediction selectors indicating the not-taken branch instruction are modified to indicate the next branch instruction (in program order) within the cache line (or sequential if there are no subsequent branches within the cache line).

The prediction selectors corresponding to the cache lines indexed by each fetch address, as well as the branch prediction information from the corresponding pool of branch prediction storage locations, are stored in a branch prediction shift register structure not shown) or other storage, such that the prediction selectors and branch predictions may be updated. The branch prediction shift register structure assigns a branch tag to the corresponding branch instruction, and the branch tag is conveyed to branch prediction unit 14$a$ upon detection of a misprediction or upon successful completion of the branch instruction for updating the branch prediction information. The prediction selectors and corresponding branch prediction information are updated in response to the misprediction or successful completion of the branch instruction. Additional information regarding a branch prediction shift register may be found in the commonly assigned, co-pending patent application entitled: "A Branch Prediction Storage for Storing Branch Prediction Information Such that a Corresponding Tag May be Routed with the Branch Instruction" Ser. No. 08/713,287, filed Sep. 12, 1996, by Tran.

The disclosure of this patent application is incorporated herein by reference in its entirety.

It is noted that, if the amount of time needed to select a branch prediction storage location using multiplexors 58 and 84, to propagate the selection through logic block 88, and to select the branch prediction from shared prediction storage 54 is greater than the desired cycle time, than the prediction selectors may be expanded to include a predicted branch prediction storage location. The predicted branch prediction storage location is the branch prediction storage location selected during a previous fetch of the corresponding cache line. The branch prediction in the predicted branch prediction storage location is used as the branch prediction for the current fetch, and the branch selector selected from the prediction selector corresponding to the cache line being fetched is later used to verify the predicted branch prediction storage location. If the prediction is incorrect, the correct prediction is provided in the subsequent clock cycle and a single cycle "bubble" in the instruction processing pipeline is created.

Turning now to FIG. 6, an example of branch selectors for a particular cache line are shown. The example represents a sixteen byte cache line with one branch selector for each byte. The cache line represented includes branch instructions ending at byte positions one, three, seven, and ten. The first branch instruction a subroutine return instruction (branch selector="1" in hexadecimal). The second branch instruction is represented by branch prediction $P_7$ of the corresponding pool of branch prediction storage locations. Similarly, the third and fourth branch instructions are represented by branch predictions $P_4$ and $P_1$ of the corresponding pool, respectively. If a fetch address referencing the cache line represented by FIG. 6 has an offset of 6, branch selector 5 (from offset position 6) is used to form a branch prediction. If a fetch address referencing the cache line has an offset of 12, branch selector 0 (the sequential address) is used to form the branch prediction.

As FIG. 6 illustrates, the branch prediction storage location is selected from the branch selectors within the cache line based upon the offset of the fetch address within the cache line. Each byte stores the prediction selector of the predicted-taken branch instruction which is encountered first when executing instructions beginning at that byte and continuing in a sequential manner through the subsequent bytes of the cache line.

It is noted that, according to certain embodiments, a portion of a cache line may be fetched in a given clock cycle as opposed to an entire cache line. For example, instruction cache 16 may comprise 32 byte cache lines. However, a given fetch address may cause one 16 byte portion (either the upper 16 byte portion so the lower 16 byte portion, whichever contains the byte indicated by the offset of the fetch address) is provided. Shared branch prediction storage 54 may be configured within branch prediction storage locations for the entire cache line, and the prediction selector for the cache line identifies the branch prediction storage locations used for the portion of the cache line being fetched. For example, for the embodiment depicted in FIG. 5, branch selectors corresponding to the portion being fetched identify the branch prediction storage location storing the appropriate branch prediction for any byte within the cache line, even if only a portion of the cache line is being fetched. Similarly, the embodiment of FIGS. 9–11 may be operable when a portion of a cache line is fetched in any given clock cycle.

Figure 7:
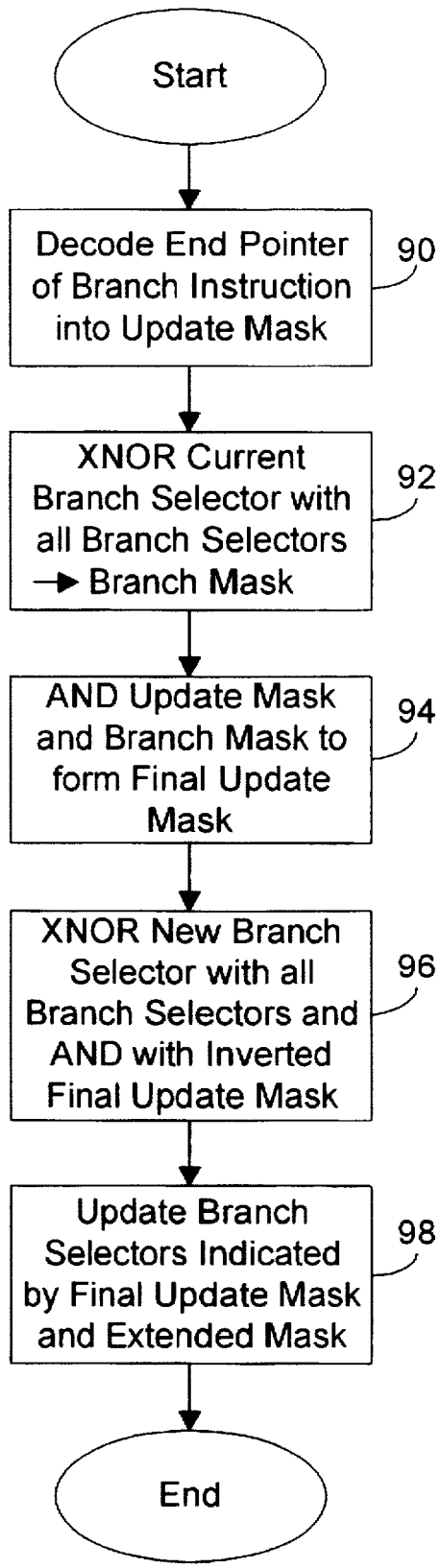
FIG. 7 is a flowchart depicting steps performed to update the branch selectors.

Turning now to FIG. 7, a flow chart depicting the steps employed to update the prediction selectors of a cache line in response to a mispredicted branch instruction is shown. The misprediction may be the result of detecting a branch instruction for which prediction information is not stored in shared prediction storage 54, or may be the result of an incorrect taken/not-taken prediction.

Upon detection of the misprediction, branch prediction unit 14a receives an "end pointer": the offset of the end byte of the mispredicted branch instruction within the corresponding cache line. Additionally, the branch tag corresponding to the branch instruction is provided, whereby the prediction selectors and branch prediction information are provided for update. Branch prediction unit 14a decodes the end pointer into an update mask (step 90). The update mask comprises a binary digit for each byte within the cache line. Digits corresponding to byte, prior to and including the end byte of the branch instruction within the cache line are set, and the remaining digits are clear.

Branch prediction unit 14a identifies the current branch selector. For mispredicted taken/not-taken predictions, the current branch selector is the branch selector corresponding to the mispredicted branch instruction. For misprediction due to an undetected branch, the current branch selector is the branch selector corresponding to the end byte of the undetected branch instruction. The current branch selector is XNOR'd with each of the prediction selectors in the cache line to create a branch mask (step 92). The branch mask includes binary digits which are set for each byte having a branch selector which matches the current branch selector and binary digits which are clear for each byte having a branch selector which does not match the current branch selector.

The update mask created in step 90 and the branch mask created in step 92 are subsequently ANDed, producing a final update mask (step 94). The final update mask includes binary digits which are set for each byte of the cache line which is to be updated to the new branch selector. For a mispredicted taken branch, the new branch selector is the branch selector of the byte subsequent to the end byte of the mispredicted taken branch instruction. For an undetected branch, the new branch selector is the branch selector indicating the branch prediction storage location assigned to the previously undetected branch.

An extended mask is also generated (step 96). The extended mask indicates which branch selectors in the prediction selector are to b e erased or because the branch prediction storage location corresponding to the branch selector has been reallocated to the newly discovered branch instruction or the branch prediction now indicates not taken. The extended mask is generated by first creating a mask similar to the branch mask, except using the new branch selector instead of the current branch selector (i.e. the mask is created by XNORing to the branch selectors corresponding to the cache line wits the new branch selector). The resulting mask is then ANDed with the inversion of the final update mask to create the extended mask. Branch selectors corresponding to bits in the extended mask which are set are updated to indicate the branch selector of the byte immediately subsequent to the last byte in the cache line for which a bit in the extended mask is set. In this manner, the branch prediction formerly indicated by the branch selector is erased and replaced with the following branch prediction within the cache line. During a step 98, the branch selectors are updated in response to the final update mask and the extended mask.

Turning now to FIG. 8A, an example of the update of the branch selectors using the steps shown in the flowchart of FIG. 7 is shown. Each byte position is listed (reference number 100), followed by a set of branch selectors prior to update (reference number 102). In the initial set of branch selectors 102, a subroutine return instruction ends at byte position 1 as well as a branch instruction ending at byte position 10 (indicated by branch selector number 3).

For the example of FIG. 8A, a previously undetected branch instruction is detected ending at byte position 6. Therefore, the update mask is generated as shown at reference number 104. Since the example is a case of misprediction due to a previously undetected branch instruction, the current branch selector is "3", and the XNORing of the current branch selector with the initial branch selectors yields the branch mask depicted at reference number 106. The subsequent ANDing of the update mask and the branch mask yields the final update mask shown at reference number 107. Additionally, an extended mask is created by XNORing the new branch selector ("8" in the present example) with the branch selectors shown at reference number 102 and ANDing the resulting mask with the inversion of the final update mask. Since branch selector "8" is not included in the set of branch selectors corresponding to the cache line, the extended mask is all zeros. Finally, an updated set of prediction selectors is shown at reference number 109. The updated set of branch selectors at reference number 109 reflects choosing the branch prediction storage location corresponding to prediction selector "8" for storing branch prediction information corresponding to the previously undetected branch instruction.

As noted above, since a branch selector is allocated to the previously undetected branch instruction, another cache line within the same row as the cache line represented in FIG. 8A may be updated to invalidate a previous branch prediction. A similar process to that shown in FIG. 7 may be used to perform the invalidation as well.

Turning now to FIG. 8B, a second example of update of the branch selectors according to the steps shown in FIG. 7 is shown. The rows of the second example are given the same reference numbers as the first example. In the second example, a newly discovered branch instruction is found at byte position 6, as with the previous example. However, the branch prediction storage location selected to store the new branch prediction is represented by the branch selector "3".

The update mask. branch mask. and final update mask are the same as the previous example. However, since byte positions 7 through 10 previously had branch selector "3" as the branch selector, these byte positions are updated to the branch selector following byte position 10 (branch selector "0"). Therefore, the extended mask has binary ones for byte positions 7 through 10, and the corresponding branch selectors are updated as shown in FIG. 8B.

Figure 9:
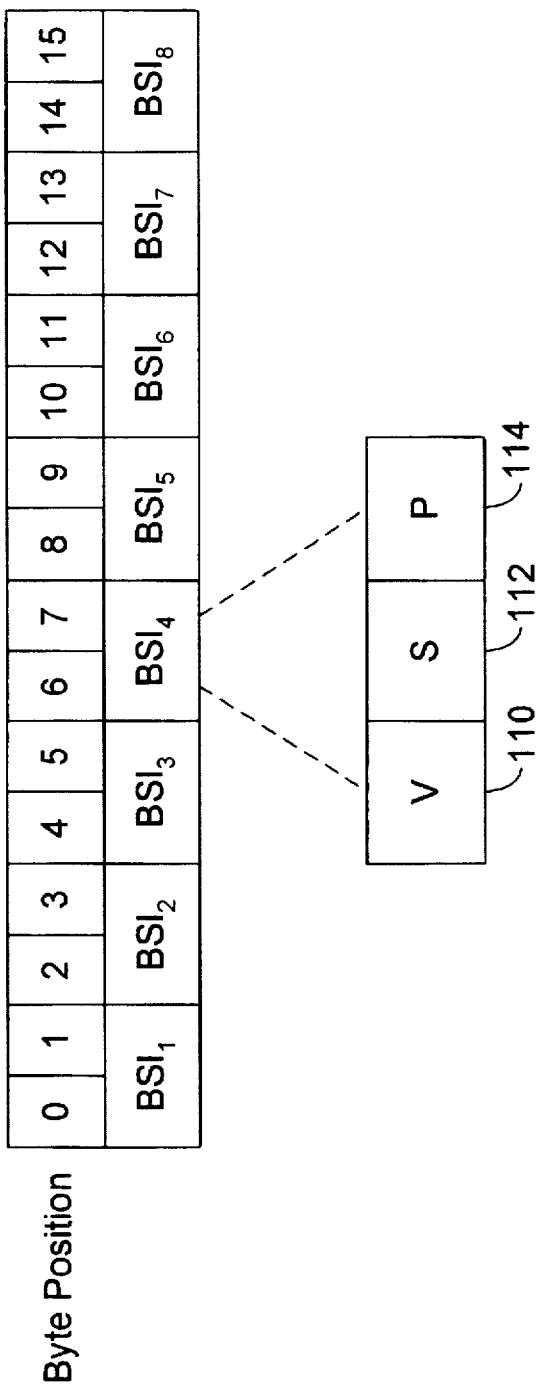
FIG. 9 is an example of a second method for selecting shared branch predictions.

Turning now to FIG. 9, a diagram depicting the prediction selectors as defined for a second embodiment of shared branch prediction is shown. The second embodiment shares branch prediction storage locations between certain byte positions of multiple cache lines. For example, the first two byte positions of each of the group of cache lines may share a first portion of the pool of branch prediction storage locations, the second two bytes of each of the group of cache lines shares a second portion of the pool of branch prediction storage locations, etc. Each portion of the pool is statically assigned to a group of byte positions from each of the group of cache lines, but the branch prediction storage locations within the portion may be dynamically reallocated to branch instructions within the group of byte positions of any of the cache lines within the group. For example, an 8 way set associative instruction cache includes 8 cache lines per row. The first two bytes of each of the eight cache lines share a first branch prediction storage location and a second branch prediction storage location. The first branch prediction storage location may be assigned to a branch instruction ending within the first two bytes of any of the eight cache lines. Similarly, the second branch prediction storage location may be assigned to a branch instruction ending within the first two bytes of any of the eight cache lines. The second two bytes of each of the eight cache lines share a third and a fourth branch prediction storage location in a similar manner, etc. The number of bytes grouped together to share a portion of the pool of branch predictions may be varied in various embodiments, as may be the number of branch prediction storage locations in a portion.

In the embodiment of FIG. 9, the number of bytes to share a portion of the pool of branch predictions is selected according to the length of branch instructions in the x86 microprocessor architecture. With the exception of the near return instruction, branch Instructions in the x86 microprocessor architecture occupy at least two bytes. Therefore, in any given two byte section of a cache line, the end of at most one branch instruction may be present. For other microprocessor architectures, the minimum number of bytes in a branch instruction may be greater or less. For such microprocessor architectures, the number of bytes grouped together to share a portion of the pool of branch prediction storage locations may accordingly be increased.

In the embodiment represented by FIG. 9, the prediction selector comprises a plurality of prediction selection indicators. Each prediction selection indicator corresponds to a particular section of the cache line. FIG. 9 depicts a sixteen byte cache line for which 8 prediction selection indicators are stored ($BSI_1$ through $BSI_8$). Indicator $BSI_1$ corresponds to byte positions zero and one of the cache line; indicator $BSI_2$ corresponds to byte positions two and three, etc. Each of the prediction selection indicators $BSI_1$ through $BSI_8$ includes a valid bit 110, a select bit 112, and a prediction bit 114. Valid bit 110 is indicative, when set, that a branch prediction for a branch instruction ending within the corresponding two bytes of the cache line is predicted by branch prediction information stored in one of the branch prediction storage locations assigned to that section of two bytes. Select bit 112 selects between the branch prediction storage locations assigned to the section of two bytes. In the present embodiment, two branch prediction storage locations are assigned to each group of two bytes. A bit is thereby sufficient to select between them. If more than two branch prediction storage locations are assigned to a group of bytes, then select bit 112 may be increased to multiple bits to select between the corresponding number of branch prediction storage locations. Finally, predict bit 114 indicates a taken/not-taken prediction for the corresponding branch instruction.

Figure 10:
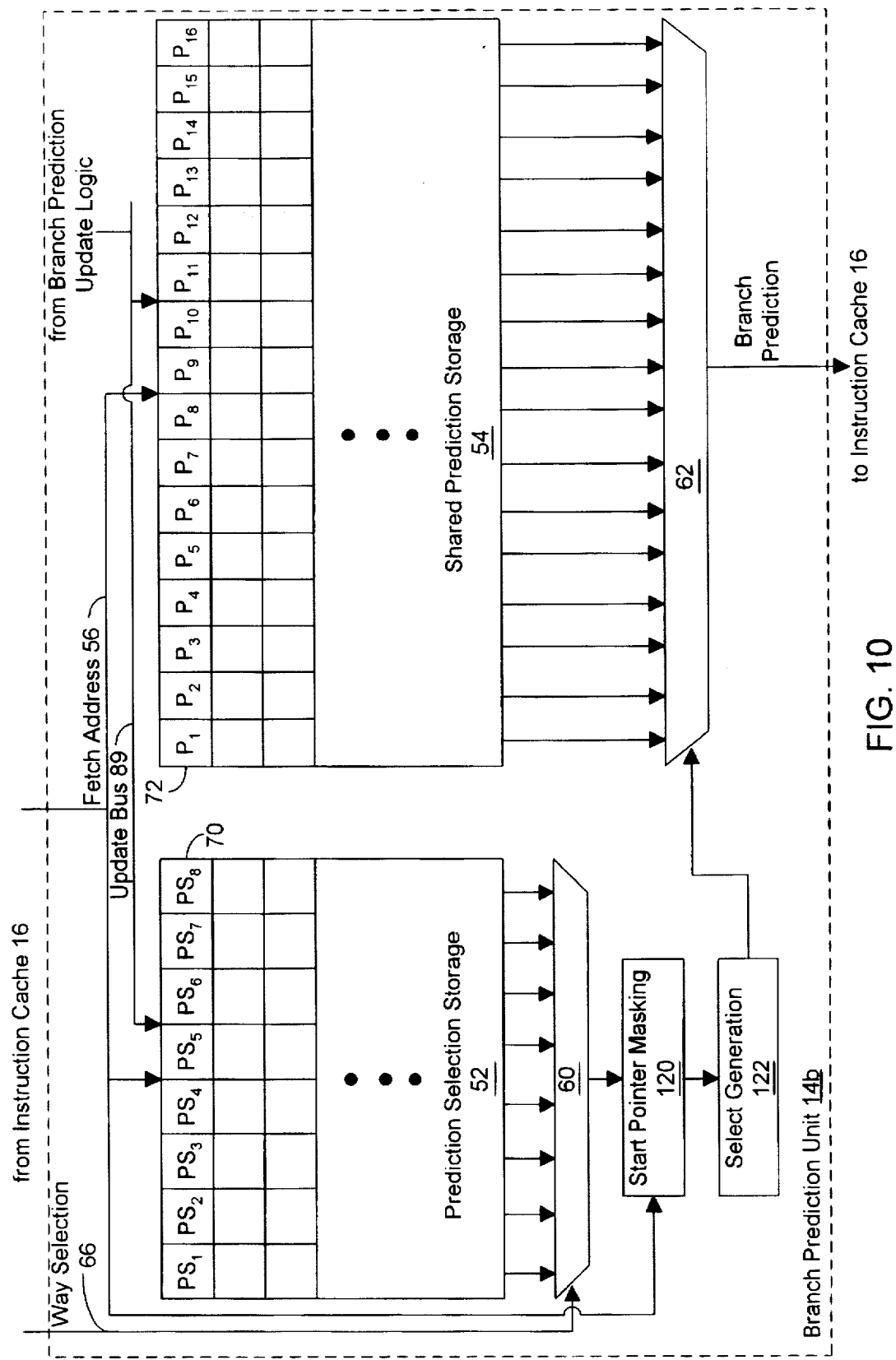
FIG. 10 is a block diagram of yet another embodiment of a shared branch prediction structure.

Turning now to FIG. 10, a block diagram of a second embodiment of branch prediction unit 14 (branch prediction unit 14b) is shown. Branch prediction unit 14b includes prediction selection storage 52, shared prediction storage 54, multiplexer 60, multiplexer 62, instruction fetch address bus 56, and way selection bus 66. Additionally, branch prediction unit 14b includes a start pointer masking block 120 and a select generation block 122. Prediction selection storage 52, shared prediction storage 54, and start pointer masking block 120 are coupled to instruction fetch address bus 56, and multiplexer 60 receives selection controls from way selection bus 66. As with the embodiments of FIGS. 3 and 5, a row of branch prediction storage locations 72 is associated with a row of prediction selectors 70 in the embodiment shown in FIG. 10. The prediction selectors in this embodiment are of the prediction selection indictors shown in FIG. 9.

In the embodiment of FIG. 10, branch prediction storage locations for $P_1$ and $P_2$ are assigned to byte positions 0 and 1 of the cache lines represented in the corresponding row of prediction selection storage 52. Similarly, branch prediction storage locations $P_3$ and $P_4$ are assigned to byte positions 2 and 3; prediction storage locations $P_5$ and $P_6$ are assigned to byte positions 4 and 5; prediction storage locations $P_7$ and $P_8$ are assigned to byte positions 6 and 7; prediction storage locations $P_9$ and $P_{10}$ are assigned to byte positions 8 and 9; prediction storage locations $P_{11}$ and $P_{12}$ are assigned to byte positions 10 and 11; prediction storage locations $P_{13}$ and $P_{14}$ are assigned to byte positions 12 and 13; and prediction storage locations $P_{15}$ and $P_{16}$ are assigned to byte positions 14 and 15. Various embodiments may vary these assignments.

As discussed with respect to FIG. 9, each prediction selection indicator indicates if a predicted-taken branch resides with the corresponding byte locations. Therefore, when a fetch of a cache line is performed, an analysis of the prediction selection indicators is performed. Generally speaking, the first predicted-taken branch subsequent to the byte position being fetched is the branch prediction to be selected for the present line. Therefore, predicted-taken branches prior to the byte position being fetched (e.g. the offset of the fetch address) are masked to not-taken. Start pointer masking block 120 performs the masking operation. Start pointer masking block 120 decodes the least significant bits of the fetch address (i.e. the offset bits) into a mask having one bit for each prediction selection indicator within the cache line. Bits corresponding to prediction selection indicators which further corresponds to byte locations prior to the byte locations indicated by the fetch address are cleared, and the remaining bits are set. The mask is then ANDed with the prediction bits 114 from each prediction selection indicator, creating a set of masked prediction bits. The first masked prediction bit within the cache line which is set identifies the prediction indicator which should be used to form the branch prediction.

Figure 11:
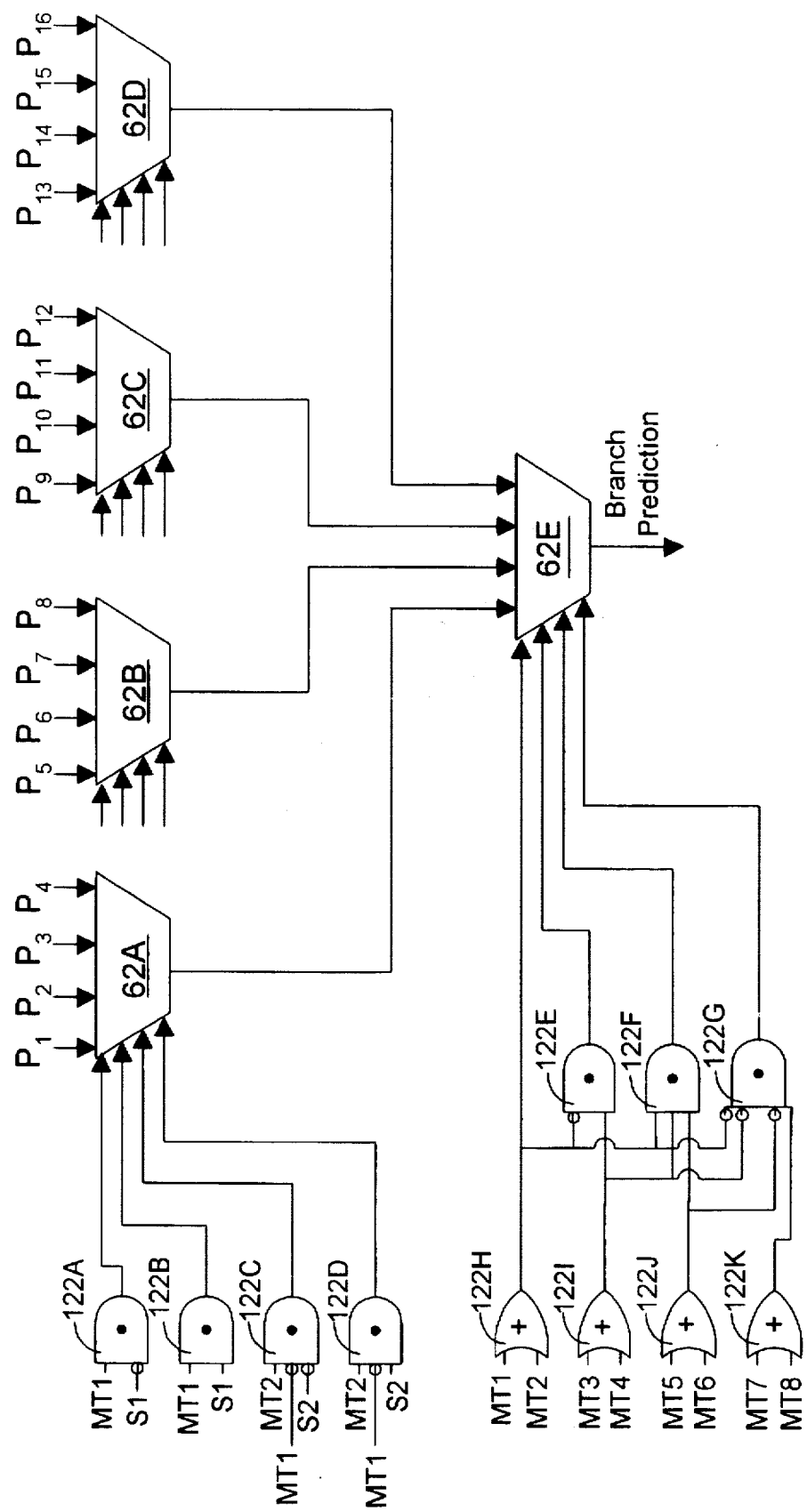
FIG. 11 is a circuit diagram depicting one embodiment of the multiplexing selection structure for branch predictions using the embodiment shown in FIG. 10.

Select generation block 122 receives the masked prediction bits as well as the select bits 112 from each prediction selection indicator. Select generation block 122 provides selection controls to multiplexor 62 to select the appropriate branch prediction from the row of branch prediction storage locations provided by shared prediction storage 54. FIG. 11 below shows one embodiment of select generation block 122.

Similar to the embodiment shown in FIG. 5, when a previously undetected branch instruction is detected and assigned a branch prediction storage location, then another cache line within the same row of instruction bytes storage 50 which has a branch instruction within the same byte locations as the previously undetected branch instruction may have a branch prediction invalidated. Therefore, the entire set of prediction selectors and branch predictions corresponding to a row may be saved in a branch tag shift register and a corresponding tag assigned to the predicted branch instruction. If a misprediction is detected due to a previously undetected branch instruction, and a branch prediction storage location is reassigned from one cache line to another, then both the cache line for which the misprediction is detected and the cache line which is losing use of the branch prediction storage location are updated to indicate the reallocation. Update bus 89 is coupled to shared prediction storage 54 and prediction selection storage 52 for conveyance of updated prediction selectors and branch prediction information.

Turning now to FIG. 11, a circuit diagram of one embodiment of select generation unit 122 and multiplexor 62 is shown. In the embodiment shown, select generation unit 122 comprises AND gates 122A, 122B, L22C, 122D, 122E, 122F, and 122G as well as OR gates 122H, 122I, 122J, and 122K. Additional AND gates similar to AND gates 122A–122D are included for each of multiplexors 62B–62D. Multiplexor 62 comprises multiplexors 62A, 62B, 62C, 62D, and 62E.

Multiplexor 62A receives predictions $P_1$ through $P_4$. Therefore, multiplexor 62A selects a prediction corresponding to byte locations 0 through 3. Masked prediction bits $MT_1$ and $MT_2$ from $BSI_1$ and $BSI_2$, respectively are used to form the selection controls. Furthermore, select bits $S_1$ and $S_2$ from $BSI_1$ and $BSI_2$, respectively, are used to form the selection controls. For example, AND gate 122A asserts a selection control causing prediction $P_1$ to be selected if masked prediction bit $MT_1$ is set (indicating a predicted taken branch ending in byte position 0 or 1) and select bit $S_1$ is clear (indicating selection of $P_1$ as the prediction corresponding to the predicted taken branch). Similarly, AND gate 122B asserts a selection control causing $P_2$ to be selected if select bit $S_1$ is set (indicating selection of $P_2$ as the prediction corresponding to the predicted taken branch). AND gates 122C and 122D cause selection of predictions $P_3$ and $P_4$, respectively. AND gates 122C and 122D include masked prediction bit $MT_1$ such that AND gates 122C and 122D do not assert selection controls unless $MT_1$ is clear.

In a similar fashion, multiplexor 62B receives selection controls derived from masked prediction bits $MT_3$ and $MT_4$ from $BSI_3$ and $BSI_4$, respectively, as well as select bits $S_3$ and $S_4$ from $BSI_3$ and $BSI_4$, respectively; multiplexor 62C receives selection controls derived from masked prediction bits $MT_5$ and $MT_6$ from $BSI_5$ and $BSI_6$, respectively, as well as select bits $S_5$ and $S_6$ from $BSI_5$ and $BSI_6$, respectively; and multiplexor 62D receives selection controls derived from masked prediction bits $MT_7$ and $MT_8$ from $BSI_7$ and $BSI_8$, respectively, as well as select bits $S_7$ and $S_8$ from $BSI_7$ and $BSI_8$, respectively. Multiplexors 62A–62D thereby select up to one branch prediction from predictions $P_1$–$P_4$, up to one branch prediction from predictions $P_5$–$P_8$, up to one branch prediction from predictions $P_9$–$P_{12}$, and up to one branch prediction from predictions $P_{13}$–$P_{16}$. Each of the selected predictions is provided to multiplexor 62E for final selection.

Multiplexor 62E selects the prediction corresponding to the first set masked prediction bit $MT_1$–$MT_8$. The first set masked prediction bit corresponds to the first branch instruction represented by predictions $P_1$–$P_{16}$ which is encountered within the cache line subsequent to the byte indicated by the fetch address. The prediction provided by multiplexor 62A is selected if either $MT_1$ or $MT_2$ is set (OR gate 122H). The prediction provided by multiplexor 62B is selected if either $MT_3$ or $MT_4$ is set (OR gate 122I), qualified by $MT_1$ or $MT_2$ being clear AND gate 122E) Similarly, OR gates 122J and 122K select the predictions provided by multiplexors 62C and 62D, qualified by AND gates 122F and 122G.

Figure 12:
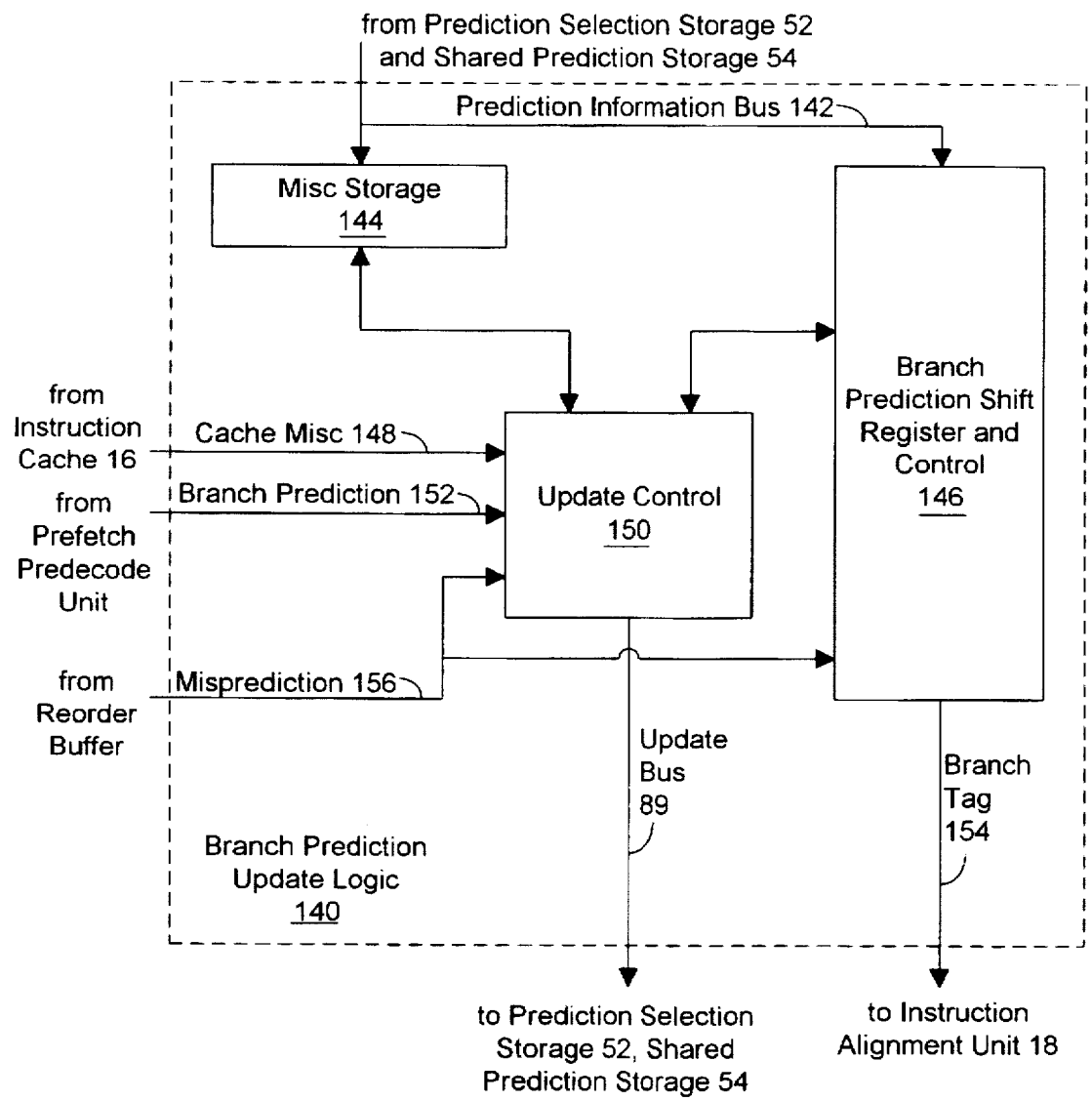
FIG. 12 is a block diagram of one embodiment of branch prediction update logic.

Turning next to FIG. 12, a block diagram of one embodiment of branch prediction update logic 140 is shown. Branch prediction update logic 140 may be employed with the embodiments of FIG. 5 or FIG. 10 (as a part of branch prediction units 14a or 14b), as well as other embodiments. Branch prediction update logic 140 receives the contents of a row of shared prediction storage 54 and a corresponding row of prediction selection storage 52 upon a prediction information bus 142. Prediction information bus 142 comprises the input lines to multiplexors 60 and 62. Prediction information bus 142 is coupled to a miss storage 144 and a branch prediction shift register and control block 146.

Miss storage 144 is used to store prediction selectors and corresponding branch prediction, for a row of instruction cache 16 accessed by a fetch address which misses. A cache miss signal upon a cache miss line 148 is asserted by instruction cache 16 when a cache miss is detected. Miss storage 144 stores the corresponding prediction selectors and branch predictions for use when the missing cache line of instructions is fetched. A way of instruction cache 16 is selected for replacement, and the corresponding branch predictions are invalidated. Prefetch/predecode unit 12, upon detecting a branch instruction in the missing cache line, signals an update control unit 150 using a branch prediction bus 152. Update control unit 150 selects a prediction storage location based upon the information stored in miss storage 144 and conveys the updated prediction selectors and branch predictions upon update bus 89 to prediction selection storage 52 and shared prediction storage 54. If prefetch/predecode unit 12 does not detect a branch instruction in the missing cache line, the prediction selectors and branch predictions as stored in miss storage 144 are conveyed upon update bus 89.

During clock cycles in which an instruction cache hit occurs, branch prediction shift register and control block 146 stores the prediction selectors and branch predictions provided upon prediction information bus 142. Furthermore, branch prediction shift register and control block 146 assigns a branch tag identifying the information, and conveys the branch tag to instruction alignment unit 18 upon a branch tag bus 154. Instruction alignment unit 18 associates the branch tag with the corresponding branch instruction for later identification.

If a branch misprediction is detected, reorder buffer 32 conveys the branch tag of the mispredicted branch instruction as well as the type of misprediction upon a mispredict bus 156 to update control unit 150 and branch prediction shift register and control block 146. Update control unit 150 receives the corresponding prediction selectors and branch predictions from branch prediction shift register and control block 146, and updates the appropriate branch prediction and prediction selector. The result is then conveyed upon update bus 89. It is noted that update control unit 150 may employ the update mechanisms described for the embodiments of FIGS. 5 and 10 for selecting branch predictions for replacement and update.

Figure 13:
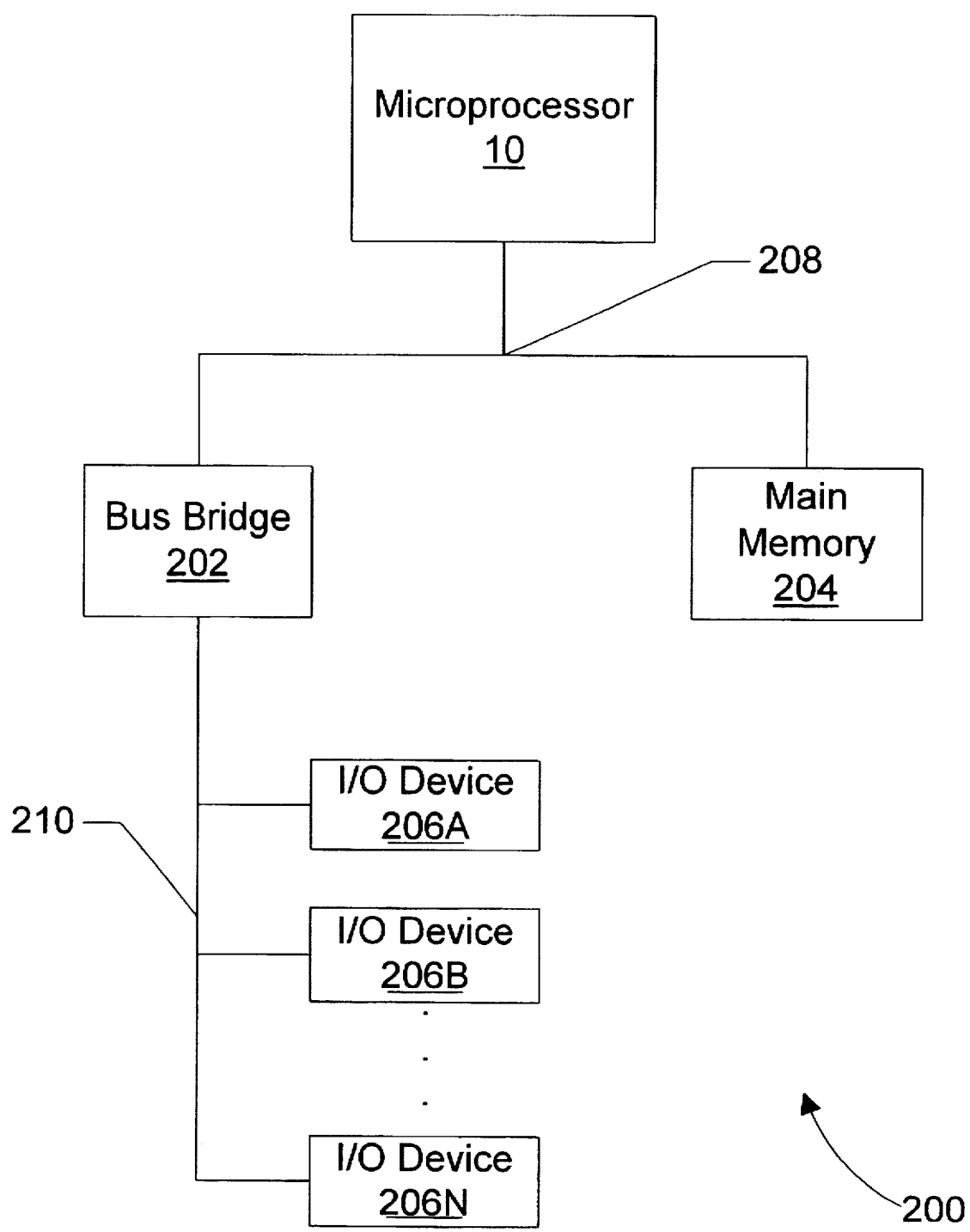
FIG. 13 is a block diagram of a computer system including the microprocessor shown in FIG. 1.

Turning now to FIG. 13, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 13 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

Although various components above have been described as multiplexors, it is noted that multiple multiplexors, in series or in parallel, may be employed to perform the selection represented by the multiplexors shown.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1

| x86 Fast Path, Double Dispatch, and MROM Instructions | |
|---|---|
| X86 Instruction | Instruction Category |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MRQM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |

TABLE 1-continued x86 Fast Path, Double Dispatch, and MROM Instructions

| X86 Instruction | Instruction Category |
|---|---|
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHC | MROM |
| XLAT | fast path |
| XLATB | fast path |
| XOR | fast path |

Note: Instructions including an SIB byte are also considered double dispatch instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, now abandoned, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", U.S. Pat. No. 5,623,619, filed Oct. 29, 1993 by Witt; "Superscalar Microprocessor Including a High Performance Instruction Alignment Unit", Ser. No. 08/377,843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Tran, et al. The disclosure of these patent applications are incorporated herein by reference in their entirety.

In accordance with the above disclosure, a shared branch prediction structure has been described. The shared branch prediction structure provides a pool of branch prediction storage locations for a group of cache lines of the instruction cache (e.g. a row of the instruction cache). The branch prediction storage locations within the pool may be dynamically reallocated among the groups of cache lines depending upon the number of branch instructions within each of the cache lines. Advantageously, a particular cache line which contains numerous branch instructions may use more branch prediction storage locations from the pool than another cache line which contains few (or even no) branch instructions. The overall utilization of the branch prediction storage locations may thereby be increased.

Numerous variations and modifications will become apparent to those skilled in the art once the above disclosure is fully appreciated. It is intended that the following claims be interpreted to embrace all such variations and modifications.

What is claimed is:

1. A branch prediction apparatus comprising:
an instruction bytes storage configured to store a first plurality of instruction bytes in a first storage location and a second plurality of instruction bytes in a second storage location; and
a branch prediction storage including a first branch prediction storage location which is shared by said first storage location and said second storage location whereby a first branch prediction corresponding to a first branch instruction within said first plurality of instruction bytes is stored in said first branch prediction storage location during a first clock cycle and a second branch prediction corresponding to a second branch instruction within said second plurality of instruction bytes is stored in said first branch prediction storage location during a second clock cycle.

2. The branch prediction apparatus as recited in claim 1 wherein said instruction bytes storage is an associative storage.

3. The branch prediction apparatus as recited in claim 2 wherein said first storage location comprises a first way of said instruction bytes storage and said second storage location comprises a second way of said instruction bytes storage.

4. The branch prediction apparatus as recited in claim 3 wherein said branch prediction storage further comprises a first plurality of branch prediction storage locations including said first branch prediction storage location, and wherein said first plurality of branch prediction storage locations comprises a pool of branch predication storage locations shared by a plurality of ways of said instruction byte storage including said first way and said second way.

5. The branch prediction apparatus as recited in claim 4 wherein said branch prediction storage comprises a first pool which is shared by a first plurality of storage locations comprising a first row of said instruction bytes storage, and wherein said branch prediction storage comprises a second pool which is shared by a second plurality of storage locations comprising a second row of said instruction bytes storage.

6. The branch prediction apparatus as recited in claim 1 further comprising a prediction selection storage configured to store a first prediction selector corresponding to said first plurality of instruction bytes and a second prediction selector corresponding to said second plurality of instruction bytes.

7. The branch prediction apparatus as recited in claim 6 wherein said first prediction selector comprises a plurality of branch selectors, wherein each one of said plurality of branch selectors corresponds to one of said first plurality of instruction bytes.

8. The branch prediction apparatus as recited in claim 7 wherein each of said plurality of branch selectors comprises a value identifying one of a pool of branch prediction storage locations within said branch prediction storage, and wherein said value is used to select a branch prediction from a plurality of branch predictions stored in said pool when said first plurality of instruction bytes is fetched.

9. The branch prediction apparatus as recited in claim 8 wherein any one of said pool of branch prediction storage locations is assignable to said first branch instruction.

10. The branch prediction apparatus as recited in claim 6 wherein said first plurality of instruction bytes and said second plurality of instruction bytes are each divided into a first portion and a second portion.

11. The branch prediction apparatus as recited in claim 10 wherein said first portions of each of said first plurality of instruction bytes and said second plurality of instruction bytes share said first branch prediction storage location.

12. The branch prediction apparatus as recited in claim 11 wherein said first prediction selector comprises a first taken/not taken prediction corresponding to said first portion and a second taken/not taken prediction corresponding to said second portion.

13. The branch prediction apparatus as recited in claim 12 wherein said branch prediction storage further comprises a second branch prediction storage location shared by said first portions of said first plurality of instruction bytes and said second plurality of instruction bytes.

14. The branch prediction apparatus as recited in claim 13 wherein said first prediction selector further comprises an indicator selecting said first branch prediction storage in a first state and selecting said second branch prediction storage in a second state.

15. A method for forming branch predictions in a microprocessor, comprising:
fetching a plurality of bytes from an instruction cache; and
selecting a branch prediction from one of a pool of branch predictions shared by said plurality of bytes and at least one other plurality of bytes within said instruction cache, said one of said pool being selected by a prediction selector corresponding to said plurality of bytes.

16. The method as recited in claim 15 wherein said plurality of bytes and said other plurality of bytes are stored within a particular row of said instruction cache.

17. The method as recited in claim 15 wherein said prediction selector comprises a plurality of branch selectors, wherein each one of said plurality of branch selectors corresponds to one of said plurality of bytes.

18. The method as recited in claim 17 wherein said selecting comprises choosing a selected one of said plurality of branch selectors, said selected one of said plurality of branch selectors corresponding to a first one of said plurality of bytes identified by a set of least significant bits of a fetch address accessing said instruction cache.

19. The method as recited in claim 15 wherein said plurality of bytes is divided into a first portion and a second portion, and wherein said prediction selector comprises a first indication corresponding to said first portion and a second indication corresponding to said second portion.

20. The method as recited in claim 19 wherein said selecting comprises choosing one of said pool as indicated by said first indication and said second indication, and wherein said first indication is used if said first indication indicates a predicted taken branch instruction, and wherein said second indication is used if said first indication indicates a predicted not-taken branch instruction and said second indication indicates a predicted taken branch instruction.

21. A microprocessor comprising:

an instruction cache configured to store a first cache line of instructions and a second cache line of instructions; and a branch prediction unit coupled to said instruction cache, wherein said branch prediction unit is configured to share a plurality of branch prediction storage locations between said first cache line of instructions and said second cache line of instructions, whereby each one of said plurality of branch prediction storage locations is assignable to store a branch prediction corresponding to a branch instruction within either one of said first cache line of instructions and said second cache line of instructions.

22. A branch prediction apparatus comprising:

an instruction cache configured to store a plurality of cache lines of instruction bytes; and a branch prediction storage including a plurality of branch prediction storage locations, wherein said plurality of branch prediction storage locations is shared between said plurality of cache lines of instructions bytes whereby any one of said plurality of branch prediction storage locations is assignable to any one of said plurality of cache lines of instruction bytes for storing a branch prediction for a branch instruction within said any one of said plurality of cache lines of instruction bytes.

* * * * *